United States Patent
Han et al.

(10) Patent No.: US 7,199,738 B2
(45) Date of Patent: Apr. 3, 2007

(54) SIGMA DELTA BEAMFORMER AND METHOD WITH REDUCED ARTIFACT

(75) Inventors: Ho-San Han, Seoul (KR); Hye-Joung Park, Seoul (KR); Tai-Kyong Song, Seoul (KR)

(73) Assignee: Siemens Medical Solutions USA, Inc., Malvern, PA (US)

( * ) Notice: Subject to any disclaimer, the term of this patent is extended or adjusted under 35 U.S.C. 154(b) by 280 days.

(21) Appl. No.: 10/402,049

(22) Filed: Mar. 28, 2003

(65) Prior Publication Data

US 2004/0189499 A1 Sep. 30, 2004

(51) Int. Cl.
H03M 3/00 (2006.01)

(52) U.S. Cl. .................. 341/143; 341/155; 341/159

(58) Field of Classification Search ............... 341/143, 341/155, 118, 119, 126, 159, 141, 140, 180, 341/156, 120
See application file for complete search history.

(56) References Cited

U.S. PATENT DOCUMENTS

| | | | | |
|---|---|---|---|---|
| 5,150,120 A * | 9/1992 | Yunus | ................... | 341/143 |
| 5,461,389 A * | 10/1995 | Dean | ................... | 342/375 |
| 5,764,523 A * | 6/1998 | Yoshinaga et al. | ................... | 702/61 |
| 5,937,341 A * | 8/1999 | Suominen | ................... | 455/324 |
| 6,154,161 A * | 11/2000 | Leme et al. | ................... | 341/143 |
| 6,208,189 B1 * | 3/2001 | Freeman et al. | ................... | 327/277 |
| 6,243,430 B1 * | 6/2001 | Mathe | ................... | 375/346 |
| 6,339,647 B1 * | 1/2002 | Andersen et al. | ................... | 381/312 |
| 6,366,227 B1 * | 4/2002 | Rigby | ................... | 341/143 |
| 6,603,804 B1 * | 8/2003 | Khoini-Poorfard et al. | . | 375/152 |
| 6,639,647 B1 * | 10/2003 | Inou | ................... | 349/189 |
| 6,670,902 B1 * | 12/2003 | Melanson et al. | ................... | 341/143 |
| 6,683,550 B2 * | 1/2004 | Al-Awadhi | ................... | 341/143 |
| 6,781,533 B2 * | 8/2004 | Yap et al. | ................... | 341/143 |
| 6,895,123 B2 * | 5/2005 | Li et al. | ................... | 382/255 |
| 2003/0128868 A1 * | 7/2003 | Li et al. | ................... | 382/128 |
| 2004/0252038 A1 * | 12/2004 | Robinson et al. | ................... | 341/143 |

OTHER PUBLICATIONS

"A Low-Power, Low-Cost, High-Performance Beamformer for Medical Ultrasound Scanners," by T.E. Linnenbrink, M.O'Donnell, S.R. Freeman, Marshall Quick, and Marc Morin; http://buLeecs.umich.edu/research/handheld/;1999, no month.

(Continued)

Primary Examiner—Linh V. Nguyen

(57) ABSTRACT

Dynamic focusing is performed at Nyquist rate $F_N$ for the received signal. For each imaging point, a single-bit SDM sample is selected from each active array channel, according to the corresponding focusing delay. A block of data, centered at the selected SDM sample, is defined for each channel. Next, bit-wise block addition is performed to obtain the sum of all the blocks. The block addition output is fed to the demodulation filter. $K(=\lceil L/M \rceil)$ demodulation filters are used. In another approach, the demodulation filters are placed just behind sigma-delta modulators. In each channel, K filters produce successively the demodulated signals for K consecutive imaging points. By taking the sum of samples retrieved from the same memory locations, dynamic focusing is achieved. Since each demodulation filter takes a single-bit SDM sequence as an input data, a simple accumulator calculates the sum of filter coefficients to be multiplied by input samples.

22 Claims, 3 Drawing Sheets

OTHER PUBLICATIONS

"A New Architecture for Ultrasound Sigma-Delta Modulation Beamformer," by Ho-San Han, Hye-Joung Park, and Tai-Kyong Song; Department of Electronics Engineering, Sogang University, South Korea; was submitted to the IEEE Society on Oct. 7, 2002 for consideration of publication.

"A Higher Order Topology for Interpolative Modulators for Oversampleing A/D Converts," by Kirk C-H Chao, Shujaat Nadeem, Wai L. Lee, and Charles G. Sodini; IEEE Transactions on Circuits and Systems, vol. 37, No. 3, pp. 309-318; Mar. 1990.

"An Ultrasound Beamformer Using Oversampling," by S.R. Freeman, M.K. Quick, M.A. Morin, R.C. Anderson, C.S. Desilets, T.E. Linnenbrink and M. O'Donnell; IEEE Ultrasonics Symposium, pp. 1687-1690; 1997, no month.

"Delta-Sigma Oversampled Ultrasound Beamformer with Dynamic Delays," by Steven R. Freeman, Marshall K. Quick, Marc, R. Carver Anderson, Charles S. Desilets, Thomas E. Linnenbrink and Matthew O'Donnell; IEEE Transactions on Ultrasonics, Ferroelectrics, and Frequency Control, vol. 46, No. 2, pp. 320-332; Mar. 1999.

"Digital Beamforming Using Non-Uniform Oversampling Delta-Sigma Conversion," by Mustafa Karaman and Mucahit Kozak, IEEE Ultrasonics Symposium, pp. 1279-1282; 1999, no month.

"Digital Phased Array Beamforming Using Single-Bit Delta-Sigma Conversion With Non-Uniform Oversampling," by Mucahit Kozak and Mustafa Karaman; IEEE Transactions on Ultrasonics, Ferroelectrics, and Frequency Control, vol. 48, No. 4, pp. 9922-931; Jul. 2001.

"A Sigma-Delta-Based Sparse Synthetic Aperture Beamformer for Real-Time 3-D Ultrasound," by Michael Inerfield, Geoffrey R. Lockwood and Steven L. Garverick; IEEE Transaction on Ultrasonics, Ferroelectrics, and Frequency Control, vol. 49, No. 2, pp. 243-254; Feb. 2002.

"Efficient, High-Performance Ultrasound Beamforming Using Over sampling," by R. Carver Anderson, Charles S. Desilets, Steven R. Freeman, Thomas E. Linnebrink, Marc A. Morin, Matthew O'Donnell, and Marshall K. Quick; Abbreviated Journal Title—Proc SPIE Int Soo Opt Eng. vol. 3341, pp. 220-227; 1998 (1 Page Abstract), no month.

"A New Architecture For a Single-Chip Multi-Channel Beamformer Based on a Standard FPGA," by B.G. Tomov, and J.A. Jensen; Abbreviated Journal Title—IEEE Ultrasonics Symposium, Proceedings, An International Symposium Part Number—vol. 2, pp. 1529-33 vol. 2, pp. 1754; 2001 (1 Page Abstract), no month.

"Sigma-Delta Based Sparse Synthetic Aperture Beamformer for Real-Time 3-D," by M. Inerfield, G.R. Lockwood and S.L. Garverick; IEEE Transaction on Ultrasonics, Ferroelectrics and Frequency Control, vol. 49, No. 2, pp. 243-54; Feb. 2002 (1 Page Abstract).

"A Dynamic Focusing Technique For Delta-Sigma-Based," by Li Pai-Chi, Huang, Jing-Jung, Liu Hsin-Lin and M. O'Donnell; Abbreviated Journal—Ultrasonic Imaging, vol. 22, No. 4, pp. 197-205; Oct. 2001 (1 Page Abstract).

"Digital Beamforming Using Non-Uniform Oversampling Delta-Sigma Conversion," by M. karaman, M. Kozak, S.C. Schneider, M. Levy, and B.R. McAvoy; Abbreviated Journal Title—IEEE Ultrasonics Symposium, Proceedings, International Symposium Part Number vol. 2 pp. 1279-82, vol. 2. pp. 1760; 1999 (1 Page Abstract), no month.

"Heterodyning Technique To Improve Performance of Delta-Sigma-Based Beamformers," by S.R. Freemean, M.K. Quick, M.A. Morin, R.C. Anderson, C.S. Desilets, T.E. Linnenbrink and M. O'Donnell; IEEE Transactions on Ultrasonics, Ferroelectrics and Frequency Control, vol. 46, No. 4, pp. 771-90; 1999 (1 Page Abstract), no month.

"Delta-Sigma Oversampled Ultrasound Beamformer With Dynamic Delays," by S.R. Freeman, M.K. Quick, M.A. Morin, R.C. Anderson, C.S. Desilets, T.E. Linnenbrink and M. O'Donnell; IEEE Transactions on Ultrasonics, Ferroelecrtics and Frequency Control, vol. 46, No. 2 pp. 320-32; Mar. 1999 (1 Page Abstract).

* cited by examiner

SIGMA DELTA BEAMFORMER AND METHOD WITH REDUCED ARTIFACT

BACKGROUND

The present invention relates to sigma-delta beamformers. In particular, a sigma-delta beamformer with reduced demodulation error is provided.

A sigma-delta (or delta-sigma) beamformer converts analog signals received on each channel or for each transducer element into a digital bit stream. The converter produces a data stream with a small number of bits, such as a single bit for each sample, at a data rate much higher than the Nyquist sampling frequency of the input signal. The converter output is beamformed and converted to a more familiar multiple-bit data stream by filtering and decimation.

Beamforming techniques based on sigma-delta modulation (SDM) have been proposed to reduce the hardware complexity of conventional multi-bit digital delay-sum ultrasound beamformers. In conventional single-bit SDM beamforming, the single-bit SDM sequence for each channel is altered in accordance with the associated dynamic focusing delays, such as by inserting or dropping a bit value. The sum of all these altered sequences are then passed to a demodulator, which also serves as a decimator, to obtain the aimed focused signal. This whole process is equivalent to taking the sum of demodulation outputs for the altered (or distorted) SDM sequences. Due to this signal distortion for focusing, conventional single-bit dynamic focusing produces low SNR images. Moreover, the demodulator is a FIR lowpass filter that requires a few hundred multipliers in most cases.

BRIEF SUMMARY

The present invention is defined by the following claims, and nothing in this section should be taken as a limitation on those claims. By way of introduction, the preferred embodiments described below include methods and systems for beamforming with a sigma-delta beamformer. By dynamically selecting bits or blocks of data in each of the sigma-delta bit streams for inter-channel combination, data is provided for summing or focusing without introduced errors from inserted or dropped bits. By positioning the low pass filter within each channel, accumulators free of multipliers may be used for focusing, resulting in a circuit with fewer gates, transistors or components. Small ultrasound systems, such as handheld or portable ultrasound systems, transducer probes with integrated beamformers and multi-dimensional transducer arrays with a large number of elements benefit greatly in such reduction in size and the resulting reduced power consumption.

In one aspect, a method for sigma-delta beamforming in a medical ultrasound system is provided. First and second sigma-delta bit streams are generated for respective first and second channels. For each of the first and second channels, at least two bits are selected within the first and second sigma-delta bit streams, respectively. First data from the first channel is summed with second data from the second channel where the first and second data are responsive to the selecting of bits within the bit streams.

In a second aspect, another method for sigma-delta beamforming in a medical ultrasound system is provided. First and second sigma-delta data streams are generated for respective first and second channels. First and second data is accumulated in response to the first and second sigma-delta data streams for respective first and second channels, respectively. Data from the first channel is combined with data from the second channel at a rate lower than the first sample rate.

In a third aspect, a sigma-delta beamformer for medical ultrasound beamforming is provided. The beamformer includes a plurality of channels, each channel with a sigma-delta analog-to-digital converter and an accumulator connected with an output of the sigma-delta analog-to-digital converter. A summer connects with the plurality of channels.

In a fourth aspect, a sigma-delta beamformer for medical ultraound beamforming is provided. The beamformer includes registers for selecting sigma-delta data without inserting bits or removing bits.

Further aspects and advantages of the invention are discussed below in conjunction with the preferred embodiments.

BRIEF DESCRIPTION OF SEVERAL VIEWS OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE PREFERRED EMBODIMENTS

A multiplierless single-bit beamformer eliminates or reduces the demodulation error. Dynamic focusing is performed at the Nyquist rate, $F_N$, for the received signal, meaning that the time interval between successive imaging points is the reciprocal of $F_N$. For each imaging point, a single-bit SDM sample is selected from each active array channel, according to the corresponding focusing delay. A block of data centered at the selected SDM sample is defined for each channel. Next, bit-wise block addition across channels is performed to obtain the sum of all the blocks. The output of the block addition is fed to the demodulation or low pass filter. Sigma-delta beamformer focusing is provided without inserted bits. If the block length is set equal to the demodulation filter length, the focused signals are produced without any signal distortion. Since the demodulation filter length L is generally larger than the over sampling ratio M, however, $K(=\lceil L/M \rceil)$ demodulation filters allow for beamforming without any signal distortion due to inserted bits.

Figure 1:
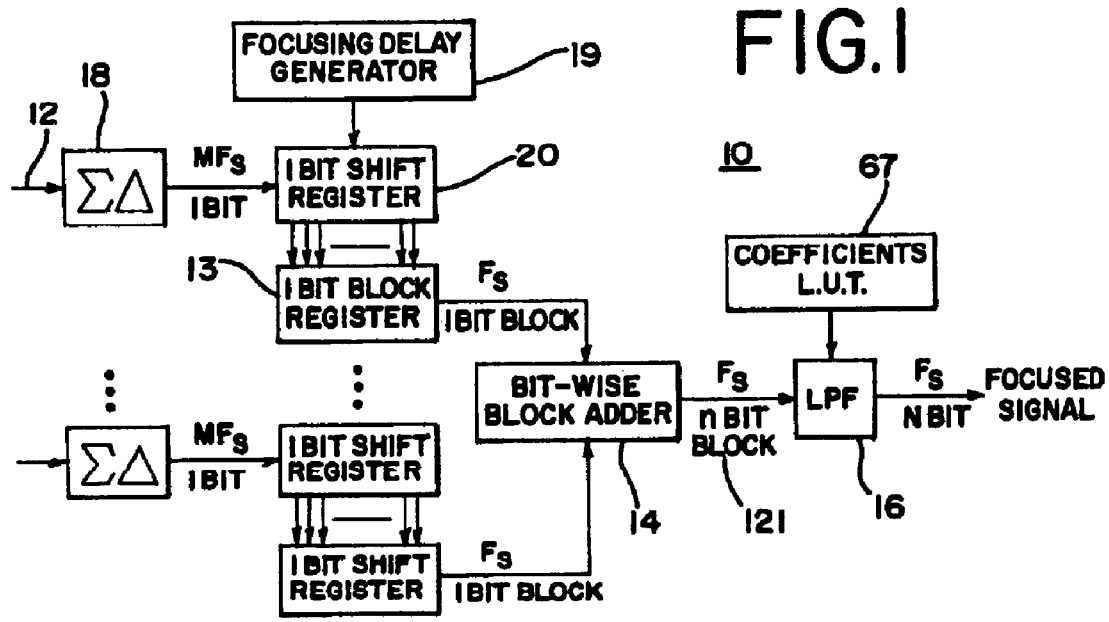
FIG. 1 is block diagram of one embodiment of a sigma-delta beamformer.

FIG. 1 shows a sigma-delta beamformer 10 for medical ultrasound beamforming in one embodiment. The sigma-delta beamformer 10 includes a plurality of channels 12, a 1 bit block register 13, a summer 14 connected with the plurality of channels 12 and a low pass filter 16 connected with an output of the summer. Additional, different or fewer components may be provided. The sigma-delta beamformer 10 is implemented as a single application specific integrated circuit, a digital signal processor, a processor, discrete digital circuits, analog devices or combinations thereof.

Each channel 12 connects with a transducer. For example, each channel connects with a respective transducer element of an array. The transducer elements are PZT elements or CMUT devices. Where CMUT devices are used, none, part or all of the sigma-delta beamformer 10 is integrated on a same substrate as the elements.

Each channel 12 includes a sigma-delta analog-to-digital converter 18 and a 1 bit shift register 20 connected with an output of the sigma-delta analog-to-digital converter 18. Additional, different and fewer components may be provided for each channel 12. While two channels 12 are shown, any number of channels may be provided, such as 2, 64, 128 or 254.

The sigma-delta analog-to-digital converters 18 are now known or later developed sigma-delta converters. For example, a single bit sigma-delta analog-to-digital converter is used. In alternative embodiments, a multi-bit sigma-delta converter is used. The sigma-delta analog-to-digital convert 18 has a plurality of transistors operable at a high sampling rate to sample an analog input signal. The converters 18 output a first value (e.g. 1) for an increasing analog sample and a different value (e.g. 0) for a decreasing analog sample as compared to the previous sample. The converters 18 sample at any of various rates, such as 160 MHz for a 10 MHz or less ultrasound signal. The sample rate is greater than the Nyquist rate, typically be a factor of 10 or more, but may be less or more.

Each 1 bit shift register 20 is operable to receive data output by the respective sigma-delta analog-to-digital converter 18 and temporary store them on a first-in first-out basis. Each 1 bit block register 13 selects a block of data from the respective 1 bit shift register 20.

Each 1 bit block and shift register 13, 20 is operable to select a block of data output by the respective sigma-delta analog-to-digital converter 18 in response to a focal delay. The blocks of data are selected at the Nyquist rate or another rate less than the sigma-delta data stream rate. The 1 bit shift register 20 is responsive to a focusing delay generator 19, focus control, look-up table or other source of focal information. The focal information indicates the time or bit position within the sigma-delta data stream for a focal point of a particular channel 12.

The block adder 14 receives the selected data for a particular focal point from each of the channels 12. The data is summed bit-by-bit to generate a signal string representing the focal point. These focused SDM samples are simultaneously fed to the demodulation filter 16. Since the block samples 121 for each channel 12 are not altered during the entire process, the demodulation filter 16 output will be substantially identical to the output of a beamformer, in which the 1-bit SDM data is demodulated first in each channel and then delay-sum beamforming is performed on the demodulated signals at Nyquist rate.

Figure 2:
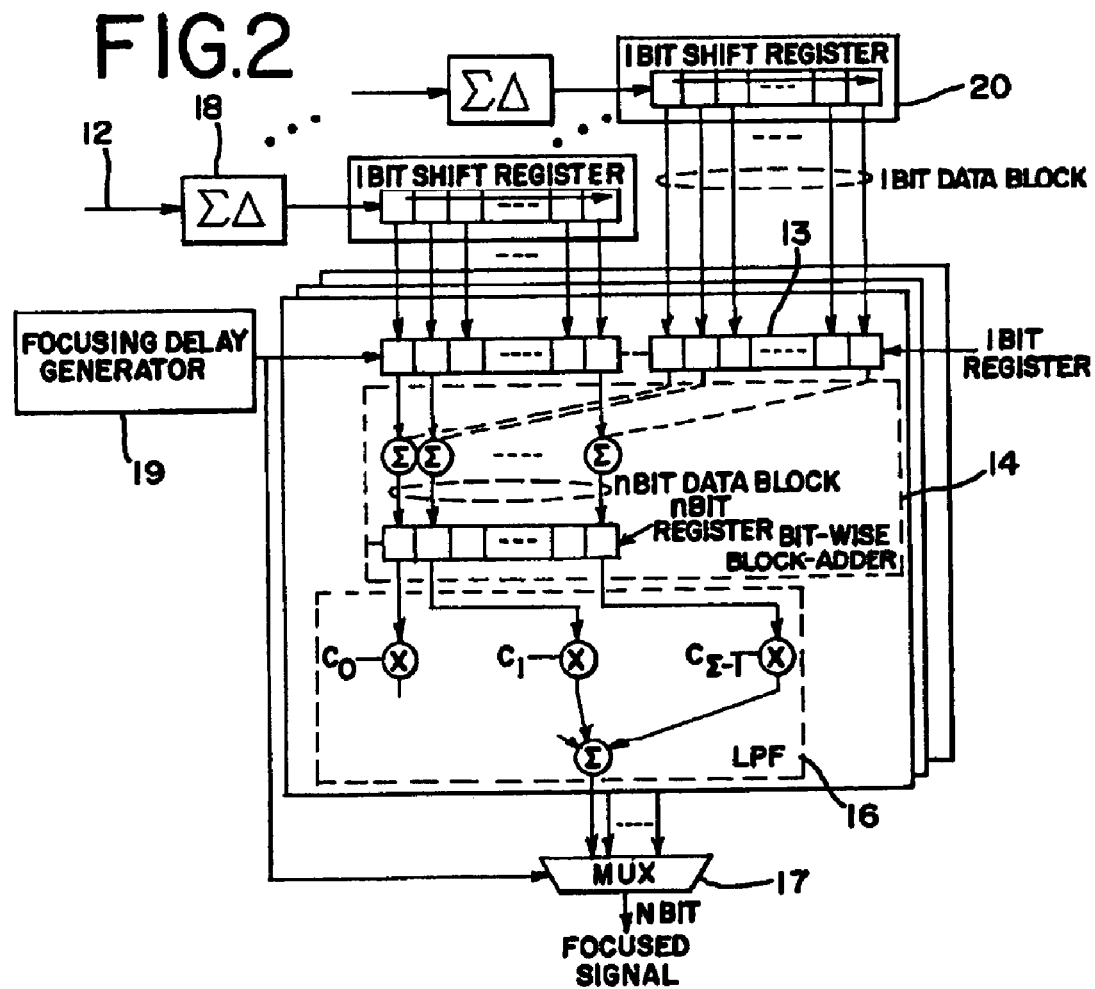
FIG. 2 is detailed block diagram of FIG. 1.

Direct realization of the FIG. 1 scheme uses one block adder 14 and demodulation filter 16 if the filter length L of the low pass filter 16 is smaller than the over-sampling ratio M. But, the filter length L is generally larger than the over-sampling ratio, since the demodulation filter should have a narrow transition band with sufficient stop-band attenuation. Since the demodulation filter length L is generally larger than the over sampling ratio M, K(=⌈L/M⌉) block adders 14 and LPFs 16 may generate output data responsive to overlapping sets of sigma-delta bits for K consecutive focal points to allow for fine focusing. FIG. 2 shows detailed architecture using K block adders 14 and K LPFs 16, where the block adder and LPF architectures are illustrated in detail. The K LPF outputs are selected successively by K to 1 MUX 17 to produce the aimed focused signals in a proper order. The filter output represents the multiple-bit signal for a focal point. The multiple blocks of the low pass filter 16 represent the temporal performance of summing and demodulating for successive focal points.

Figure 3:
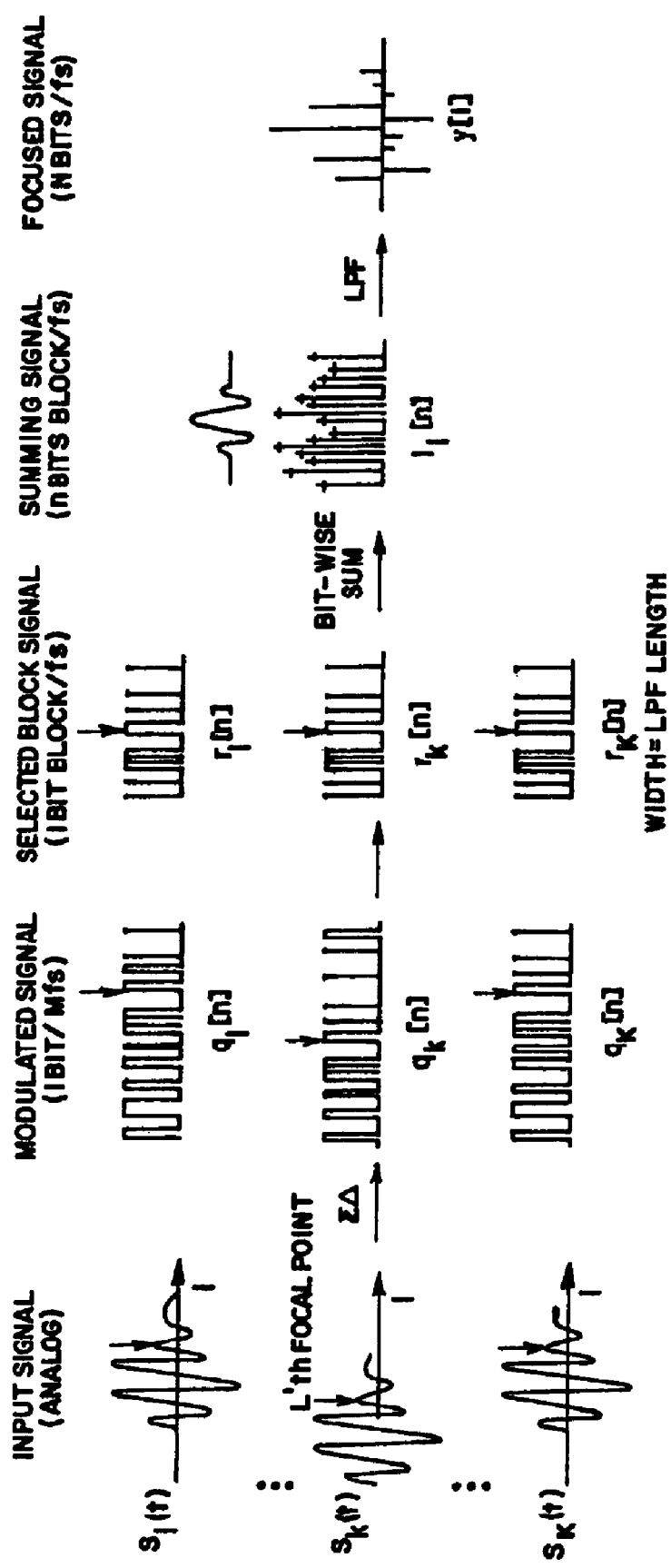
FIG. 3 is a graphical representation of a flow of a sigma-delta beamforming process in one embodiment.

FIG. 3 represents the method of sigma-delta beamforming in FIG. 1 and FIG. 2. Example signal waveforms output at each step or stage of the beamformer 10 are illustrated.

Sigma-delta bit streams are generated for each channel. For example, single bit sigma-delta bit streams are generated at an over-sampling rate. The received radio frequency or analog signals are converted into over-sampled 1-bit data sequence $q_k[n]$ of data rate $MF_S$ rate through SDM, where the subscript k represents the channel index, M represents an over sampling ratio and $F_S$ is the final desired sampling frequency, such as the Nyquist frequency.

As shown also in FIG. 1 and FIG. 2, for each channel 12, a block of SDM data, $r_k[n]$, of length L is selected for each receive focal point. The position within the sigma-delta bit streams of each of the blocks corresponds to a focusing delay. The length of each block is set the same as the demodulation filter length. The block update rate is $F_S$. The focusing delays are updated at $F_S$. For each focusing delay pattern, a block of SDM data is selected from each channel 12.

All these data blocks are then added on a bit-to-bit basis. Data from the first channel is summed with second data from the second channel. The summed data is responsive to the selected blocks of data from multiple channels for a given focal point. These blocks are added together to yield a block of focused SDM data.

These focused SDM samples are fed to the demodulation filter. The focused block data i[n] is multiplied bit-to-bit with the impulse response of the demodulation filter. The coefficients of the low pass filter are selected to generate a multiple-bit value representing the analog signals from the focal point. The results of the multiplication of the bit values by the filter coefficients are added together to produce the aimed focused signal.

Since the block samples for each channel 12 are not altered between the sigma-delta analog-to-digital converters 18 and the low pass demodulation filters 16, the demodulation filter 16 output is the substantially the same as the output of a beamformer in which the 1-bit SDM data is demodulated first in each channel and in which delay-sum beamforming is then performed on the demodulated signals at the Nyquist rate. Therefore, the resulting signals are free from the signal distortion due to the dynamic focusing delays in a conventional SDM beamformer. In alternative embodiments, some alteration of the signals is provided.

Figure 4:
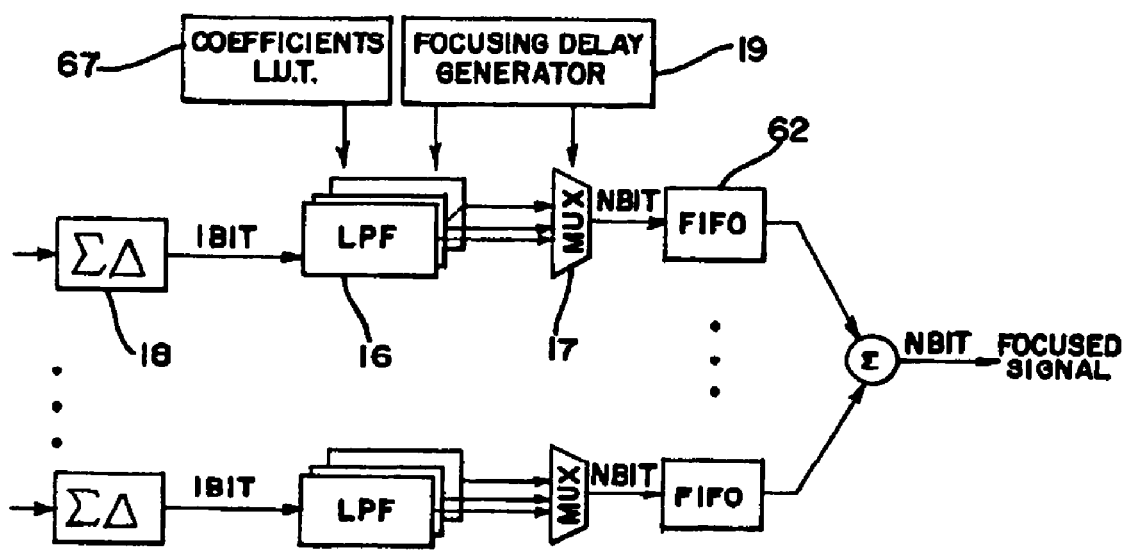
FIG. 4 is a block diagram of another embodiment of a sigma-delta beamformer.
Figure 5:
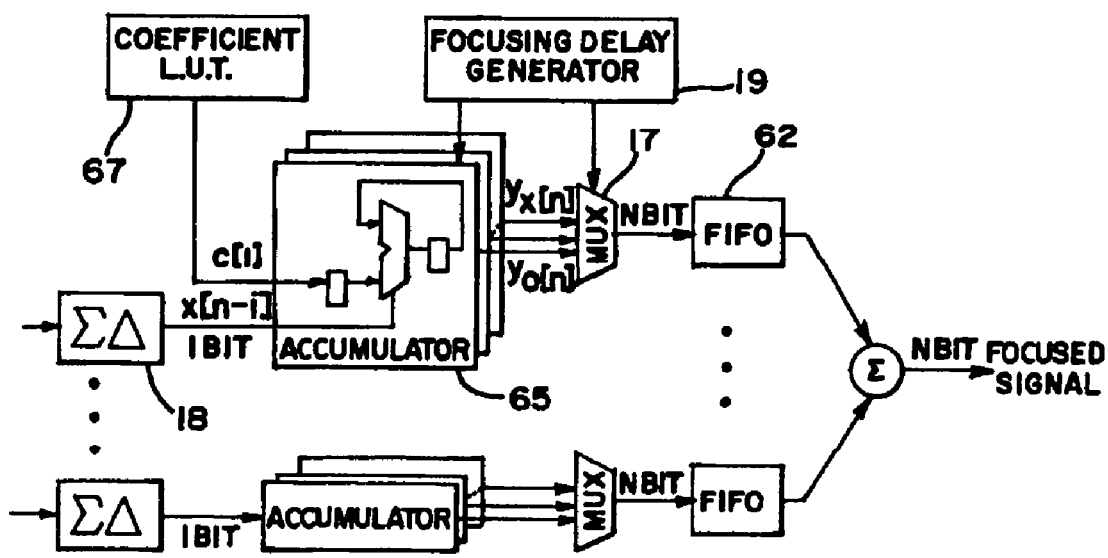
FIG. 5 is a circuit diagram of another embodiment of a sigma-delta beamformer.

FIG. 4 shows another embodiment, where the K LPFs 16 and K to 1 MUX 17 in FIG. 2 are placed just behind the sigma-delta analog-to-digital converters 18 of each channel 12. Since the input to each demodulation filter 16 is 1-bit SDM data in this embodiment, however, each demodulation filter 16 can be replaced with a simple accumulator 65 as shown in FIG. 5. Each accumulator 65 sums the filter coefficients 16 in a manner that filter coefficients to be multiplied by nonzero SDM samples are added and other coefficients are subtracted. This embodiment is free from multipliers, resulting in reduced hardware complexity compared to the embodiment scheme in FIG. 2, since the filter length is much larger than the number channels and each accumulator 65 is more simple than a multiplier.

The accumulator 65 is also responsive to a source of coefficients 67, such as a coefficient look-up table, processor or other source of coefficient values. The source of coefficients 67 connects to multiple channels, but in other embodiments different sources or look-up-tables for each channel is provided. The different or multiple sources together are a source of coefficients 67 for a plurality of channels. The filter coefficients are precalculated and stored in a coefficient look-up table. The filter coefficients produce the multi-bit sample at the filter output.

In this embodiment, a plurality of accumulators 65 are provided for each of the plurality of channels 12 as shown in FIG. 5. The plurality of accumulators 65 switchably connect with the first-in first-out register 62 by K to 1 MUX 17. This modification does not change the final output, but requires using K accumulators 65 per each channel 12. Only one accumulator 65 may be used if the filter length L of the low pass filter 16 is smaller than the over-sampling ratio M. But, the filter length L is generally larger than the over-sampling ratio, since the demodulation filter should have a narrow transition band with sufficient stopband attenuation. Since the demodulation filter length L is generally larger than the over sampling ratio M, K(=⌈L/M⌉) accumulators 65 allow for beamforming without any signal distortion due to inserted bits. Each accumulator 65 in a same channel 12 generates output data responsive to overlapping sets of sigma-delta bits to allow for fine focusing. In each channel 12, the K accumulators 65 produce successively the demodulated signals for K consecutive imaging points. For each channel 12, the K accumulators 65 produce the demodulated signals for receive focal points successively at the rate of $F_N$, which are stored successively in a two-port memory 62 by K to 1 MUX 17. The focused signal can be obtained by simply adding the samples stored at the same address of all the memories 62 for each channel 12.

In one example, a 3.5 Mhz linear array having 192 elements, 60% 6 dB bandwidth, and 0.2 mm inter-element spacing is used. The number of active channels to form each scanline is assumed to be 64. The transmit focus is fixed at z=30 mm and dynamic focusing is employed on receive. The over-sampling ratio of 8, M=8, is used for a normal 20 MHz sample rate. Hence, the SDM data rate is 160 MHz. The low pass demodulation filter 16 is a 160 tap finite impulse response low pass filter. As compared to a non-SDM beamformer having eight bit analog-to-digital converters in each channel, the above described SDM beamformer may provide similar resolution and have similar axial responses. A single bit SDM beamformer using inserted bits for implementing delays may suffer form high noise levels (−20 dB~−40 dB), particularly in the near field where focusing delays change with time more dynamically.

Given a similar performance under the circumstances described above, an advantage is provided in hardware complexity or cost. For an SDM beamformer example, a 160-tap FIR filter is used for demodulation (L=160), $F_n$=20 MHz, over-sampling rate M is 8, and hence K=20. In comparison with a traditional delay-sum beamformer using 8-bit 40 MHz ADCs, the overall beamformer complexity may be reduced by about 80% in gate counts. In addition, because the SDM beamformer described above is implemented with simple adders instead of multipliers, the operation speed may be increased with minimal hardware cost or complexity.

Reduced hardware complexity may result in less power consumption during operation. Either one or both of less complexity and lower power consumption may be advantageously used for portable or handheld ultrasound systems, transducer probes with integrated beamformer components and/or transducers with a large number of elements or channels (e.g. multi-dimensional arrays). For example, the sigma-delta beamformer with an accumulator in each channel for focusing is used in a portable or handheld ultrasound system disclosed in U.S. Pat. Nos. 6,312,381, 5,957,846, 6,251,073, 5,817,024 and 6,383,139, the disclosures of which are incorporated herein by reference. Such handheld ultrasound systems may include a housing, a transducer, user controls, a battery, a transmitter, a display and a receive beamformer. The housing is adapted to be portable or handheld, such as being less than 8 inches in any dimension and/or having an ergonomic shape for holding in a user's hand. The transducer 18 is within the housing along with all or at least other portions of the ultrasound circuitry, including the sigma-delta receive beamformer. In an alternative embodiment, a probe housing separate from the housing for the ultrasound circuitry is used.

While the invention has been described above by reference to various embodiments, it should be understood that many changes and modifications can be made without departing from the scope of the invention. For example, the sigma-delta beamformer may be used in a standard, cart mounted ultrasound system. Different or additional receive beamforming processes may be used with the sigma-delta beamformer. Other sigma-delta processes may be used or incorporated, such as inserting some extra bits but also using accumulators in the same or different channels. The accumulators may be used with selection of blocks of SDM data without alteration in a combination embodiment. In particular, the accumulators combine filter coefficients in response to SDM data free of additional inserts or removed bits for focusing purposes.

It is therefore intended that the foregoing detailed description be understood as an illustration of the presently preferred embodiment of the invention, and not as a definition of the invention. It is only the following claims, including all equivalents, that are intended to define the scope of this invention.

What is claimed is:

1. A method for sigma-delta beamforming in a medical ultrasound system, the method comprising:
   (a) generating first and second sigma-delta bit streams for respective first and second channels;
   (b) for each of the first and second channels, selecting at least two bits within the first and second sigma-delta bit streams, respectively; and
   (c) summing first data from the first channel with second data from the second channel, the first and second data responsive to the selecting of (b) without altering the selected data;
   wherein (b) comprises selecting blocks of data within single bit streams and not selecting other data within the single bit streams.

2. The method of claim 1 wherein (a) comprises generating the first and second sigma-delta bit streams as single bit sigma-delta bit streams.

3. The method of claim 1 wherein (b) comprises selecting first and second blocks of data from each of the first and second sigma-delta bit streams, a position within the first and second sigma-delta bit streams of each of the blocks corresponding to a focusing delay.

4. The method of claim 3 further comprising:
   (d) filtering an output responsive to with a filter having a first length;
   wherein a length of each of the first and second blocks is a substantially same as the first length.

5. The method of claim 1 wherein (b) comprises selecting with a shift register.

6. The method of claim 5 wherein (b) comprises selecting free of inserted bits.

7. The method of claim 1 further comprising low pass filtering an output of the summation.

8. The method of claim 1 wherein (b) comprises selecting two different sets of data within each of the first and second sigma-delta bit streams, each of the two different sets of data within the seine channel having data common to both sets and each of the two different sets of data within the same channel being responsive to different focusing delays.

9. The method of claim 1 wherein comprises adding with a bit-to-bit adder.

10. A method for sigma-delta beamforming in a medical ultrasound system, the method comprising:
   (a) accumulating first, second and third sets of filter coefficients responsive to first, second and third sigma-delta data streams for respective first, second and third channels, respectively; and
   (b) combining first, second and third data responsive to the accumulated first; second and third set of filter coefficients from the first, second and third channels, with each other;
   wherein (a) comprises combining the filter coefficients corresoonding to each of the first, second and third simna-delta bit streams; and
   wherein (b) comprises summing the filter coefficients of the accumulated sets of filter coefficients within each of the first second and third channels.

11. The method of claim 10 wherein (a) comprises accumulating in response to the first, second and third sigma-delta data streams as single bit sigma-delta data streams.

12. The method of claim 10 wherein (a) comprises low pass filtering the each of the first, second and third sigma-delta data streams.

13. The method of claim 10 wherein (a) comprises accumulating free of multiplication.

14. The method of claim 10 wherein the processing starting with (a) and finishing with (b) is free of multiplication of data.

15. A sigma-delta beamformer for medical ultrasound beamforming, the beamformer comprising:
   a plurality of channels, each channel comprising:
   a sigma-delta analog-to-digital converter; and
   an accumulator connected with an output of the sigma-delta analog-to-digital converter;
   a summer connected with the accumulators of the plurality of channels;
   wherein each accumulator is operable to select a block of data output by the respective sigma-delta analog-to-digital converter in response to a focal delay; and
   a source of filter coefficients connected with the accumulators of the plurality of channels, the accumulators operable to add and subtract coefficient values from the source as a function of data from the sigma-delta analog-to-digital converters for each channel of the plurality of channels.

16. The beamformer of claim 15 wherein the sigma-delta analog-to-digital converters each comprise a single bit sigma-delta analog-to-digital convener.

17. A sigma-delta beamformer for medical ultrasound beamforming, the beamformer comprising:
   a plurality of channels, each channel comprising:
   a sigma-delta analog-to-digital converter;
   an accumulator connected with an output of the sigma-delta analog-to-digital convert; and
   a summer connected wit the accumulators of the plurality of channels;
   wherein each accumulator is operable to select a block of data output by the respective sigma-delta analog-to-digital converter in response to a focal delay; and
   a plurality of accumulators for each of the plurality of channels, the plurality of accumulators switchably connected with the summer.

18. The beamformer of claim 15 wherein the plurality of channels are free of any multipliers between the sigma-delta analog-to-digital converters and the summer.

19. The beamformer of claim 15 wherein at least a portion of the sigma-delta bearnformer is housed within a portable ultrasound system or a transducer probe.

20. A sigma-delta beamnformer for medical ultrasound beamforming, the beamformer comprising:
   a plurality of channels, each channel comprising:
   a sigma-delta analog-to-digital converter, and
   a register operable to select blocks of data output by the sigmadelta analog-to-digital converter in response to a focal delay, the selected blocks of data free of bit inserts and bit removal as a function of focal delay;
   a summer connected with the registers of the plurality of channels; and
   a low pass filter connected with the summer.

21. The beamformer of claim 20 wherein the register comprises a shift register and a block select register.

22. The beamformer of claim 20 wherein the summer comprises a multiple bit adder operable for bit-to-bit addition.

* * * * *